(12) United States Patent
Plath

(10) Patent No.: US 7,028,996 B2
(45) Date of Patent: Apr. 18, 2006

(54) VEHICLE SUSPENSION SYSTEM AND HEIGHT CONTROL VALVE THEREFOR

(75) Inventor: Victor A. Plath, Nunica, MI (US)

(73) Assignee: Haldex Brake Corporation, Kansas City, MO (US)

( * ) Notice: Subject to any disclaimer, the term of this patent is extended or adjusted under 35 U.S.C. 154(b) by 0 days.

(21) Appl. No.: 10/214,036

(22) Filed: Aug. 7, 2002

(65) Prior Publication Data

US 2003/0038412 A1    Feb. 27, 2003

Related U.S. Application Data

(63) Continuation of application No. PCT/US00/23278, filed on Aug. 24, 2000.

(60) Provisional application No. 60/150,621, filed on Aug. 24, 1999.

(51) Int. Cl.
*B60G 17/00* (2006.01)

(52) U.S. Cl. .............................. 267/64.17; 267/64.16; 267/DIG. 1; 280/6.159

(58) Field of Classification Search ............... 188/190, 188/195, 205 R, 266.3, 266.4; 267/DIG. 1, 267/DIG. 2, 64.16, 64.17, 64.28, 123; 280/6.15, 280/6.151, 6.157, 6.159; 137/625.15, 625.21, 137/119.09, 595, 596, 596.1, 596.2; 251/157, 251/170, 172, 175, 192
See application file for complete search history.

(56) References Cited

U.S. PATENT DOCUMENTS

| | | | | |
|---|---|---|---|---|
| 1,555,199 A | * | 9/1925 | Gouirand ................. | 280/6.159 |
| 2,790,650 A | * | 4/1957 | Boschi ..................... | 280/6.158 |
| 2,905,430 A |   | 9/1959 | Deist ........................... | 251/54 |
| 2,910,305 A |   | 10/1959 | Marette et al. ............. | 280/124 |
| 2,948,549 A | * | 8/1960 | Schultz ................... | 267/DIG. 1 |
| 2,964,311 A | * | 12/1960 | Stelzer ..................... | 267/64.16 |
| 3,083,059 A | * | 3/1963 | Biszantz .................... | 298/17 S |
| 3,104,114 A |   | 9/1963 | Vogel .......................... | 280/6.1 |
| 3,563,270 A | * | 2/1971 | Denny .................... | 137/625.21 |
| 4,756,548 A |   | 7/1988 | Kaltenthaler et al. ....... | 280/702 |
| 4,809,957 A |   | 3/1989 | Schonfeld ................. | 267/64.11 |
| 4,974,861 A | * | 12/1990 | Itoh et al. ................. | 280/6.158 |
| 4,976,104 A |   | 12/1990 | Morris et al. ................. | 60/412 |
| 5,048,867 A |   | 9/1991 | Gradert ....................... | 280/840 |
| 5,161,579 A |   | 11/1992 | Anderson, Jr. ........... | 137/627.5 |
| 5,161,817 A |   | 11/1992 | Daum ........................ | 280/714 |

(Continued)

FOREIGN PATENT DOCUMENTS

DE    1144125    2/1963

(Continued)

OTHER PUBLICATIONS

Communication pursuant to Article 96(2) EPC, dated Nov. 24, 2003 for Application No. 00 959 363.3-2421.

*Primary Examiner*—Thomas Williams
(74) *Attorney, Agent, or Firm*—St. Onge Steward Johnston & Reens LLC

(57) ABSTRACT

A height control valve for controlling the relative height between a vehicle frame and a trailing arm suspension. The height control valve comprises a housing defining an interior chamber and having an inlet port fluidly connecting to a source of pressurized air. An air spring port is provided in the housing for fluidly connecting to an air spring. Additionally, an exhaust port is provided in the housing for fluidly connecting to the atmosphere. A valve is disposed within the interior chamber and is selectively operable between a fill position, an exhaust position, and a neutral position.

29 Claims, 13 Drawing Sheets

U.S. PATENT DOCUMENTS

| | | | |
|---|---|---|---|
| 5,211,449 A | 5/1993 | Amtsfeld | 303/9.66 |
| 5,375,819 A | 12/1994 | Galazin et al. | 267/64.16 |
| 5,472,227 A | 12/1995 | Schönfeld et al. | 280/714 |
| 5,499,845 A | 3/1996 | Geiger et al. | 280/840 |
| 5,560,591 A | 10/1996 | Trudeau et al. | 267/64.16 |
| 5,651,555 A * | 7/1997 | O'Reilly et al. | 280/6.158 |
| 5,724,860 A * | 3/1998 | Sekiguchi et al. | 74/567 |
| 5,860,450 A | 1/1999 | Trudeau et al. | 137/627.5 |
| 6,089,551 A | 7/2000 | Haviland et al. | 267/64.16 |

FOREIGN PATENT DOCUMENTS

| | | |
|---|---|---|
| DE | 3045690 A1 * | 7/1982 |
| FR | 2 483 337 | 12/1981 |
| FR | 2 687 350 | 8/1993 |
| WO | WO 95/09093 | 4/1995 |
| WO | WO 95/29823 | 11/1995 |

* cited by examiner

VEHICLE SUSPENSION SYSTEM AND HEIGHT CONTROL VALVE THEREFOR

This application is a continuation of pending International Application No. PCT/US00/23278 filed Aug. 24, 2000, which designates the United States and claims priority benefits of U.S. Provisional Patent Application Ser. No. 60/150,621 filed Aug. 24, 1999.

BACKGROUND OF THE INVENTION

1. Field of the Invention

The invention relates to a trailing arm suspension for a vehicle; and, more particularly, to a height control valve for controlling the ride height of the suspension relative to the vehicle.

2. Description of the Related Art

Trailing arm suspensions are well known and are commonly used in heavy-duty vehicles, such as semi-tractor/trailer configurations. The trailing arm suspension comprises opposing trailing arm assemblies mounted on opposite sides of the vehicle, preferably the vehicle frame rails. Each of the trailing arm assemblies includes a trailing arm having one end pivotally connected to a hanger bracket suspended from the frame rail. The other end of the trailing arm mounts to an air spring, which is affixed to the frame rail. The air spring dampens the pivotal rotation of the trailing arm about the hanger bracket relative to the frame rail.

An axle assembly typically spans and mounts to, or is carried by, the trailing arms. The axle assembly rotatably mounts ground-engaging wheels. Any movement of the wheels in response to their contact with the ground will result in a rotation of the trailing arms, which is dampened by the air springs.

The air springs typically comprise an air bag from which pressurized fluid can be introduced or exhausted to adjust the dampening performance of the air spring. Additionally, the volume of air in the air spring can be adjusted to alter the height of the frame rails relative to the trailing arms. Often, there is a preferred ride height for the trailer and, depending on the load carried by the trailer, the ride height can vary. Pressurized air is introduced to or exhausted from the air bags to adjust the relative height of the trailer frame rail with respect to the trailing arms for a particular load.

The adjustment of the ride height is traditionally accomplished by a height control valve having an inlet port, an air spring port, and an exhaust port. The inlet port is fluidly connected to the pressurized air system of the vehicle. The air spring port is fluidly connected to the air bags of the air springs and, the exhaust port is fluidly connected to the atmosphere. The air spring port can be fluidly connected to either the inlet port or the exhaust port to introduce or exhaust pressurized air from the air springs. A three-position valve is typically used to provide for the fluid connections necessary to introduce and exhaust pressurized air from the air bags. The housing is typically mounted to the vehicle or vehicle frame and the lever arm is typically mounted to the trailing arm, whereby any movement of the lever relative to the valve housing is indicative of the relative change in position between the trailing arm and the vehicle.

The various height control valves currently available can be operated on a time delay or can respond instantly to changes in height. The valve structure for these valves typically includes multiple spring biased pistons or similar elements that seal the various ports in response to the relative movement of the trailing arm. Examples of this type of height control valve are disclosed in U.S. Pat. No. 5,161,579, issued Nov. 10, 1992; U.S. Pat. No. 5,560,591, issued Oct. 1, 1996; and U.S. Pat. No. 5,375,819, issued Dec. 27, 1994. These valves tend to use a seal in the form of an O-ring or the like that surround the dynamic or moving piston to seal the piston relative to the valve housing. These "dynamic" seals are subject to wear as the piston reciprocates, leading to their eventual failure.

Outside the context of a height control valve and in the context of a seat adjustment valve, it is known to use a shear valve structure to fluidly connect a pressurized air inlet port to an air cylinder or connect the air cylinder to atmosphere to extend or retract the air cylinder to raise and lower a vehicle seat. The shear valve comprises a chamber that is fluidly connected to the cylinder. A shear valve selectively connects the chamber to either an inlet port or an exhaust port to extend or retract the cylinder. The shear valve comprises a fixed disk positioned within the chamber with an opening connected to the cylinder and openings fluidly connected to the inlet port and the exhaust port. A rotatable disk having a passage that selectively overlies the inlet port opening and the exhaust opening is selectively rotated by the vehicle user to fluidly selectively connect the cylinder port to the inlet port or the exhaust port to extend or retract the cylinder to raise and lower the seat.

There is still a need for a height control valve that does not use traditional seals on dynamic elements of the valve while still providing consistently repeatable performance.

SUMMARY OF THE INVENTION

The invention relates to a height control valve for controlling the relative height between a vehicle frame and a trailing arm suspension. The trailing arm suspension comprises a trailing arm having one end pivotally mounted to the vehicle frame and carrying an axle that rotatably mounts ground engaging wheels. An air spring is positioned between another end of the trailing arm and the vehicle to resist the rotation of the trailing arm relative to the frame. The height control valve according to the invention preferably comprises a housing defining an interior chamber and having an inlet port fluidly connected to a source of pressurized air. An outlet port is provided in the housing for fluidly connecting to the air spring. Additionally, an exhaust port is provided in the housing for fluidly connecting to the atmosphere. A valve is disposed within the interior chamber and is selectively operable between a fill position, an exhaust position, and a neutral position. In the fill position, the air spring port is fluidly connected to the inlet port to introduce pressurized air from the air source into the spring. In the exhaust position, the air spring port is fluidly connected to the exhaust port to permit the exhaustion of pressurized air from the air spring. In the neutral position, the air spring port is not fluidly connected to either the inlet port or the exhaust port. By moving the valve between the neutral, fill and exhaust positions, it is possible to expand or deflate the air spring and thereby adjust the relative height of the vehicle frame to the trailing arm.

In one aspect, the invention relates to the valve further comprising a rotatable valve element disposed within the interior chamber and fluidly separating the inlet port and the exhaust port. The rotatable valve element has a control passage that selectively fluidly connects the air spring port to the inlet port or outlet port upon the rotation of the rotatable valve element between a fill and exhaust position. The rotatable valve element is preferably biased into sealing abutment relative to the housing by the pressure from the pressurized air.

In another aspect, the invention relates to a modular port structure in which the housing comprises a manifold body defining an air spring chamber to which the air spring port terminates and an inlet chamber from which the inlet port originates in combination with a manifold cover that is removably mounted to the manifold body to enclose the air spring chamber and the inlet chamber. The manifold cover preferably comprises at least one air supply connector for fluidly coupling an air supply to the inlet chamber and at least one air spring connector for fluidly connecting the air spring chamber to the air spring. The manifold cover can further comprise additional accessory connectors for fluidly connecting a vehicle accessory to the air spring chamber.

Preferably, a modular dump valve is mounted between the manifold body and the manifold cover for selectively fluidly connecting the air spring port to the exhaust port to dump the pressurized air from the air springs independent of the position of the height control valve.

In yet another aspect, the invention relates to the height control valve including a lever having one end operably connected to the valve to selectively move the valve between the fill, exhaust, and neutral positions, and other end adapted to be connected to the trailing arm. In this configuration, the rotation of the trailing arm moves the lever to thereby move the valve between the neutral, fill, and exhaust positions. Preferably, in this configuration, the valve comprises a movable valve element and the lever comprises first and second elongated arms. The first arm has one end fixedly coupled to the movable valve element and the second arm has one end adapted to be connected to the trailing arm. The second arm is rotatably adjustable relative to the first arm to provide for adjusting the height of the lever relative to the trailing arm.

Another aspect of the invention relates to the valve further comprising a moveable valve element having a control passage. The valve is movable between a first position where the control passage fluidly connects the air spring port to the inlet port to place the valve in the fill position, a second position where the control passage fluidly connects the air spring port to the exhaust port to place the valve in the exhaust position, and a third position where the control passage is not in fluid communication with either the inlet port or the exhaust port to place the valve in the neutral position. The control passage presents an increasing cross-sectional area to the air spring port as the valve is moved to either the fill or exhaust positions to provide for an increasing flow rate through the air spring port as a function of the degree of movement of the movable element.

In yet another aspect, the invention relates to a shaft extending through the housing and having a key in combination with the valve further comprising a rotatable valve element having a slot that receives the key of the shaft. A resin is disposed within the slot to fill in any spaces between the key and the slot.

DESCRIPTION OF THE PREFERRED EMBODIMENT

Figure 1:
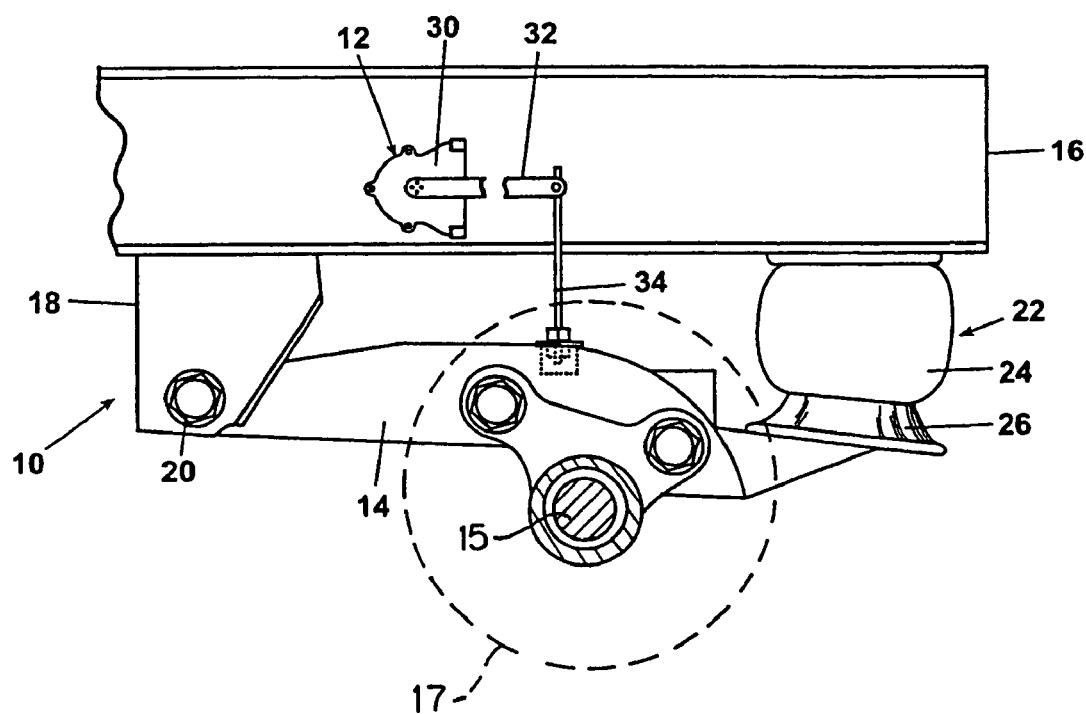
FIG. 1 is an elevational side view of a trailing arm suspension having a height control valve according to the invention.

FIG. 1 illustrates a trailing arm suspension 10 in combination with a height control valve 12 according to the invention. The trailing arm suspension 10 comprises a trailing arm 14 having a first end that is pivotally connected to the vehicle frame 16 through a hanger bracket 18. Attached to trailing arm 14 is axle 15 to which ground engaging wheel 17 is attached (shown as a dashed line). Preferable, the pivotal connection is an elastomeric bushing 20.

An air spring 22 comprising a lift bag 24 and a piston 26 is positioned between the trailing arm 14 and the frame rail 16. The lift bag 24 is connected to the vehicle frame 16 and the piston 26 is connected to the trailing arm 14. Pressurized air can be introduced or exhausted from the lift bag to control the relative position of the vehicle frame 16 and the trailing arm 14. The lift bag 24 serves to dampen the rotational movement of the trailing arm 14 about the pivotal connection 20 with the vehicle frame.

Referring to FIGS. 1–4, the height control valve 12 according to the invention comprises a housing 30 that is fixedly mounted to the vehicle frame 16 by bolts 31. A lever 32 has one end rotatably mounted to the valve 12 and the other end connected to the trailing arm 14, preferably, by way of an adjustable rod 34 extending from the trailing arm 14 to the lever 32. Movement of the trailing arm 14 about the pivotal connection 20 relative to the frame 16 causes the lever 32 to rotate relative to the valve housing 30.

The housing 30 comprises an interior chamber 36, open on one side, and a shaft sleeve 37 extending from the other side of the housing 30 and connecting with the interior chamber 36. The interior chamber is partially defined by an interior housing side wall 36A and an interior peripheral wall 36B, which extends away from the side wall 36A. A fluid manifold body 41A is integrally formed with the housing 30 and comprises an air supply port 38 and an air spring port 39. The air supply port 38 extends from the manifold body 41A and through the housing 30 to establish fluid communication with the interior chamber 36. At the fluid manifold body 41A, the supply port has an inlet opening 38A with a relatively large rectangular cross section. At the interior chamber, the supply port 38 has an outlet opening 38B with a slot-like cross section in the peripheral wall 36B.

The air spring port 39 in the housing 30 also extends from the manifold body 41A to the housing 30 to establish fluid communication with the interior chamber 36 through the side wall 36A. The air spring port 39 has a relatively large opening or outlet 39B near the manifold body 41A and converges to a relatively small tubular cross section inlet opening 39A that has a transverse component intersecting with the interior chamber side wall 36A.

An exhaust port 40 extends from the exterior of the housing 30 to the shaft sleeve 37. Specifically, the exhaust port extends to an enlarged diameter portion 37A of the shaft sleeve 37. The shaft sleeve effectively forms part of the exhaust port. The air supply port 38 is adapted to fluidly connect a source of pressurized air to the interior chamber 36. The air spring port 39 fluidly connects the interior chamber 36 to the air spring lift bag 24. The exhaust port 40 fluidly connects the chamber 36 via the shaft sleeve 37 to the atmosphere.

A modular manifold cover 41B is mounted to the housing 30 and overlies the manifold body to cover the air supply port 38 and air spring port 39. The manifold cover 41B includes an air supply hose connection 42 that is aligned with and provides fluid communication with the air supply port 38. The manifold cover 41B further includes air spring hose connections 43, 44 that are aligned with and provide fluid communication to the air spring port 39. The air supply hose connection 42 and air spring hose connections 43, 44 are known connectors for easily receiving hose couplings associated with the vehicle air supply and the air springs. A gasket 45 is provided between the manifold cover 41B and the housing 30 to enhance the fluid seal therebetween.

The modular manifold cover 41B provides the height control valve with fluid port modularity not found in prior height control valves. For example, the number and configuration of air supply port connections 42 and air spring hose connections 43, 44 can be altered by merely mounting a different cover 41B to the manifold body 41A. Thus, the height control valve according to the invention can easily be modified to accommodate different types of air supply connections 42 or air spring connections 43, 44. In addition, the number of air supply connections 42 and air spring connection 43, 44 can be altered as desire. Although, in most circumstances, only one air supply connection will be needed. Other types of air connections can be supplied instead of those connections for an air spring. The air connections can supply many different types of vehicle accessories, including anti-creep devices and the like.

Figure 2:
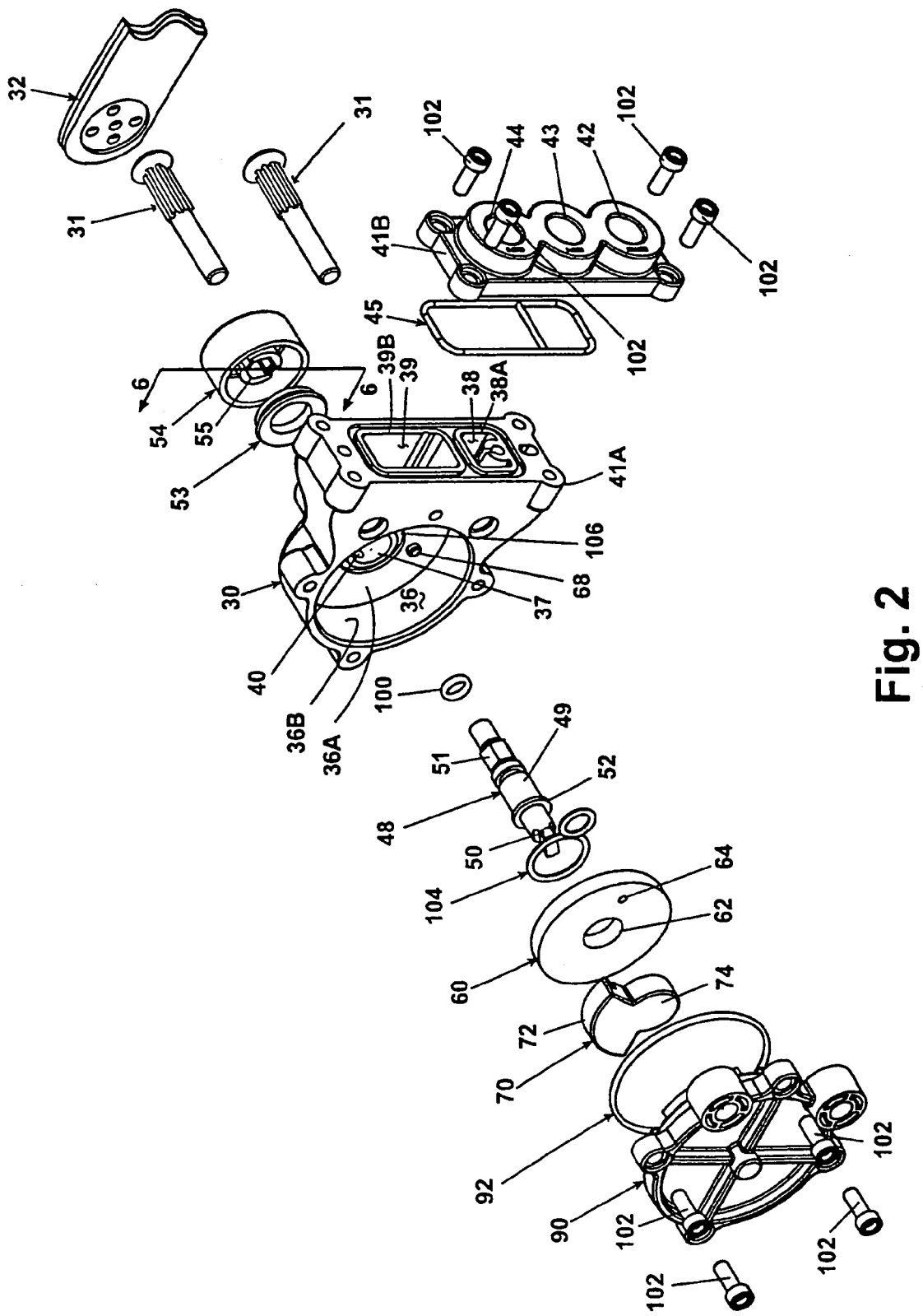
FIG. 2 is an exploded view of the height control valve of FIG. 1.
Figure 3:
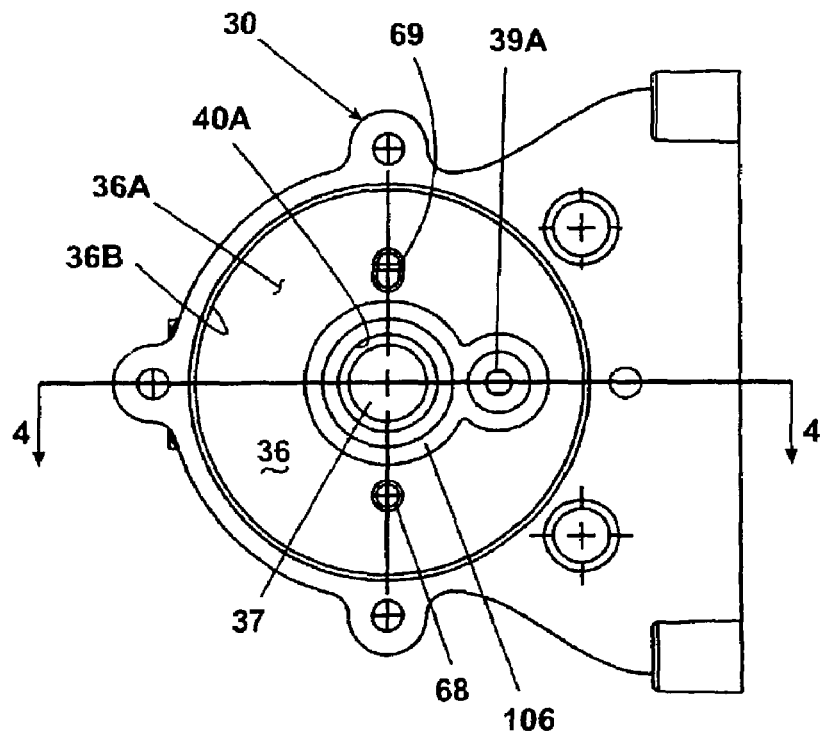
FIG. 3 is an elevational side view of the height control valve housing of FIG. 2.
Figure 4:
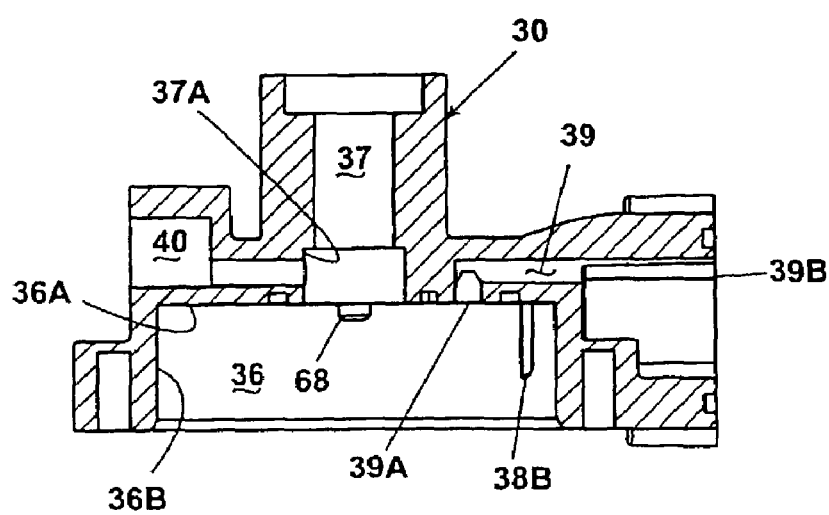
FIG. 4 is a sectional view taken along line 4—4 of FIG. 3.
Figure 5:
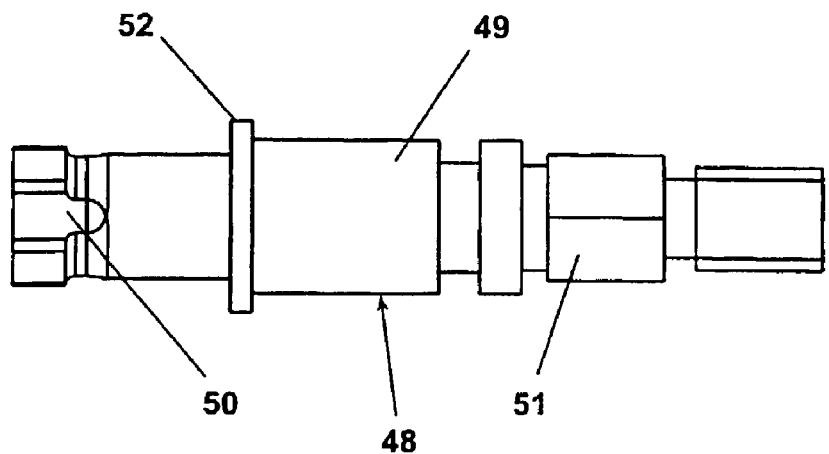
FIG. 5 is a side view of the shaft in the height control valve of FIG. 2.

Referring to FIGS. 2 and 5, a shaft 48 is received within the shaft sleeve 37. The shaft 48 has a large diameter center portion 49 and terminates in a key 50 on one end and carries an adjustable hex head 51 toward the other end. A stop collar 52 is positioned between the keyed end 50 and hex head 51. The rounded central portion is sufficiently sized to at least partially fluidly seal the shaft with respect to the shaft sleeve 37, but not with respect to the enlarged diameter portion 37A. An O-ring 100 is provided to enhance the seal of the shaft relative to the housing. A handle seal 53 and handle cap 54 are provided to seal the shaft sleeve 37 at the exterior side of the housing 30 and provide a mating surface for the handle 32.

Figure 6:
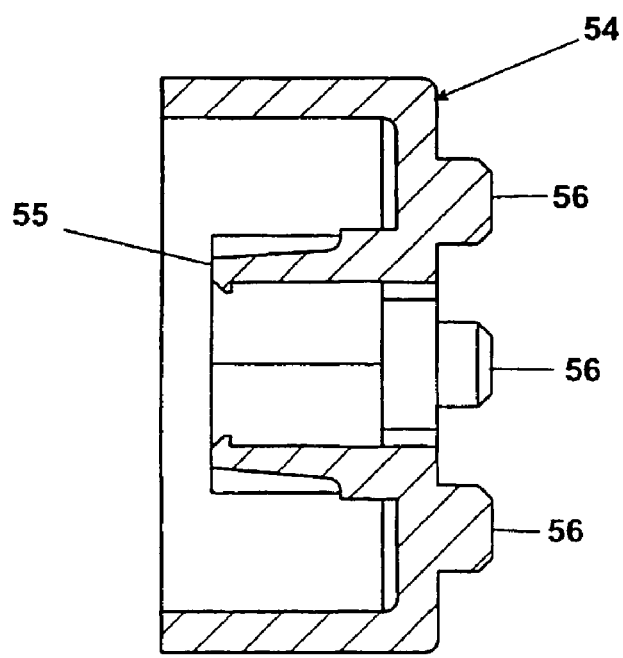
FIG. 6 is a sectional view taken along line 6—6 of FIG. 2.

Referring to FIGS. 2 and 6, the cap 54 includes a hexagonal shaft collar 55 that is sized to receive the adjustable hex head 51. The handle is fixedly mounted to the portion of the shaft adjacent the hex head 51. Multiple mounting studs 56 extend from the handle cap 54.

Figure 6A:
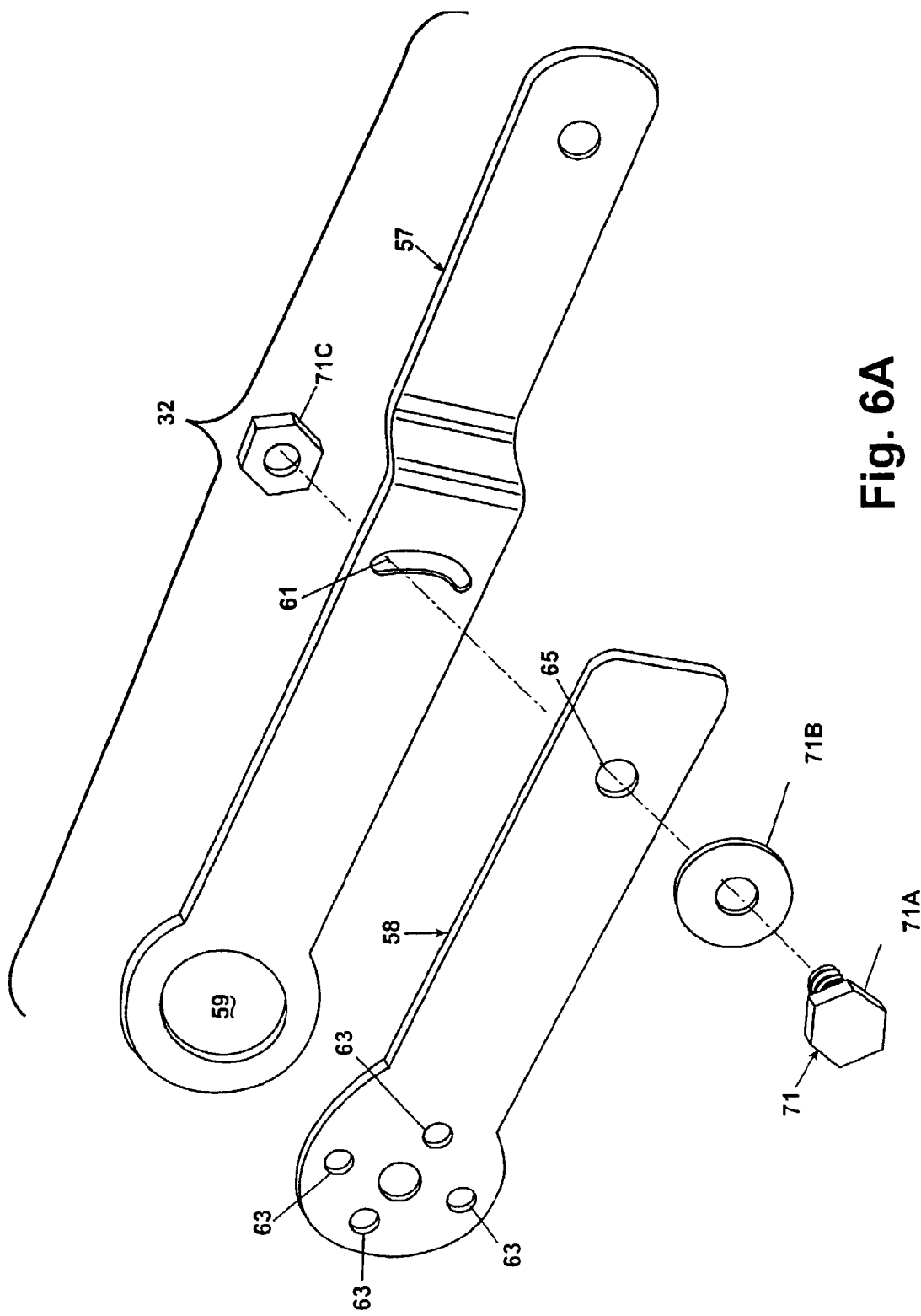
FIG. 6A is a perspective view of a multiple-arm lever for the height control valve.

Referring to FIGS. 2 and 6A, the handle 32 comprises an inner arm 57 and an outer arm 58, which together function as the entire arm or lever for the height control valve. The inner arm 57 has one end in which is formed a handle cap opening 59 whose diameter is sufficiently large enough to circumscribe the multiple mounting studs 56 extending from the handle cap 54. The handle cap opening 59 permits the inner arm 57 to be mounted to the handle cap 54 and rotate relative thereto. The inner arm 57 further includes an arcuate slot 61, whose radius of curvature originates at the center line for the handle cap opening 59. The outer arm 58 comprises multiple openings 63 located at one end thereof and which correspond in size and spacing to the multiple mounting studs 56 of the handle cap 54. A bolt hole 65 is located at the opposite end of the outer arm 58 than the openings 63 and is sized to receive a traditional fastener assembly 71 comprising a bolt 71A, washer 71B, and a nut 71C.

The dual arm construction of the lever 32 permits the lever 32 to be rotationally adjusted relative to the shaft 48. The rotational adjustment is achieved by the inner arm 57 being mounted to the handle cap 54 by positioning the mounting studs 56 within the interior of the handle cap opening 59. Since the handle cap opening 59 circumscribes the mounting studs 56, the inner arm 57 is free to rotate relative to the handle cap 54. The outer arm 58 is mounted to the handle cap 54 such that the mounting studs 56 are received within the corresponding opening 63, which effectively fixes the position of the outer arm relative to the handle cap 54 without prohibiting the rotation of the inner arm 57 relative to the handle cap 54. The fastener assembly 61 is then inserted through the bolt hole 65 in the outer arm 58 and through the arcuate slot 61 of the inner arm 57. The fastener assembly 61 effectively limits the rotation of the inner arm 57 relative to the outer arm 58 to the arc formed by the arcuate slot 61 In other words, as long as the fastener 67 extends through the bolt hole 65 in the outer arm in arcuate slot 61 of the inner arm 57, the inner arm 57 is free to rotate relative to the outer arm 58 and the handle cap 54 a rotational amount equivalent to the sector cut by the arcuate slot 61. With this configuration, the outer end of the inner arm 57 opposite the end with the handle cap opening 59 can be rotated relative to the handle cap 54 and the outer arm 58 by loosening the fastening assembly 61 and rotating the inner arm 57 relative to the outer arm 58 to provide radial adjustment of the inner arm 57 with respect to the outer arm 58 and ultimately with respect to the housing 30.

Preferably, when the inner arm 57 and outer arm 58 are aligned along their longitudinal axes, the inner arm 57 can be adjusted both positively and negatively with respect to the aligned longitudinal axes. Since the aligned longitudinal axes typically coincide with the horizontal axis of the vehicle in a standard mounting, the rotational adjustment of the inner arm relative to the outer arm 58 also includes a corresponding vertical adjustment with respect to the vehicle frame and trailing arm, effectively providing the height control valve with a height adjustment for the lever 32.

Figure 7:
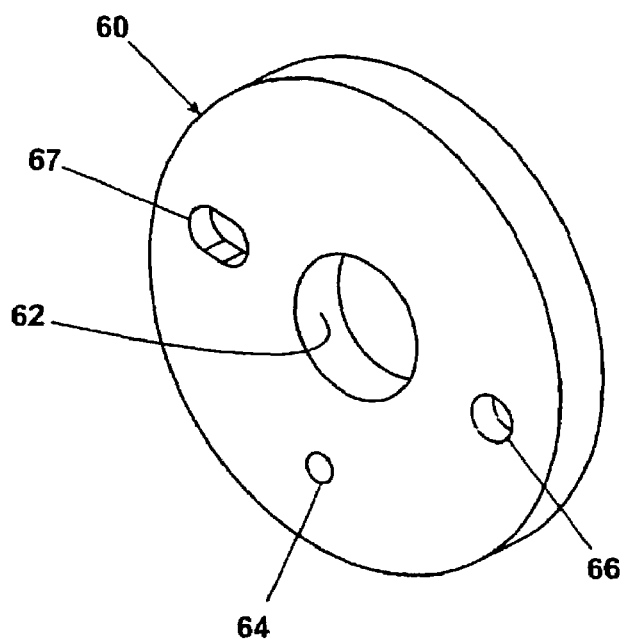
FIG. 7 is an enlarged perspective view of the shear disk shown in FIG. 2.

Referring to FIGS. 2 and 7, the height control valve further comprises a static shear disk 60 having an axial passage in the form of an opening 62 and a fluid passage in the form of an orifice 64, both of which extend through the dish 60. The static shear disk 60 includes blind alignment openings 66 and 67 that receive positioning studs 68 and 69 extending from the housing 30 into the interior chamber 36 to align the static shear disk 60 relative to the housing 30 so that orifice 64 aligns with the transverse portion of the air spring port 39. The axial opening is sized slightly larger than the shaft 48 to ensure that fluid can flow between the shaft and the opening 62 and communicate with the outlet port 40.

Figure 8:
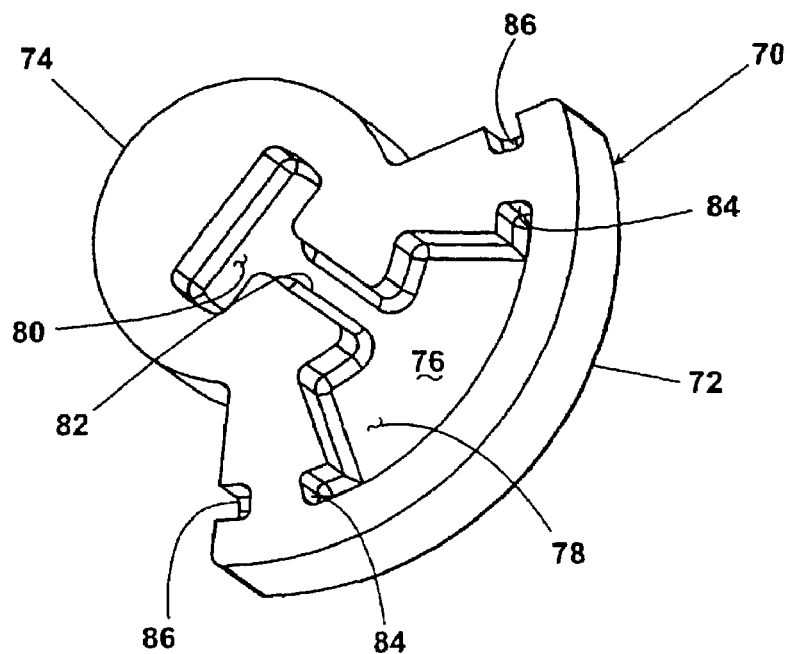
FIG. 8 is a perspective view showing the opposite side of the dynamic shear disk shown in FIG. 2.

Referring to FIGS. 2 and 8, a dynamic shear disk 70 is positioned within the interior chamber 36 of the valve housing 30 in abutting relationship with the static shear disk 60. The dynamic shear disk 70 comprises a sector portion 72 from which extends a circular lobe 74. A passage in the form of a generally I-shaped recess 76 is formed in the dynamic shear disk 70 and comprises an arcuate portion 78 and a slot portion 80, which are connected by a channel 82. The arcuate portion 78 is predominantly located in the sector portion 72 and includes opposing outlet profile slots 84. An inlet profile slot 86 is provided on the exterior side of the sector portion 72 and corresponds with one of the outlet profile slots 84.

When assembled, the orifice 64 of the shear disk 60 will lie between one of the pairs of outlet profile slots 84 and inlet profile slots 86. The key slot 80 is sized to slidably receive the key 50 on the shaft 48. The connecting slot fluidly connects the key slot 80 to the arcuate portion 78.

Preferably, a suitable resin, such as an epoxy, is disposed within the key slot 80 to fill in any gaps existing between the key 50 and the key slot 80. The resin fill eliminates any play between the key 50 and the key slot 80 so that any rotation of the shaft 48 results in an immediate and corresponding rotation of the dynamic disk 70, which improves the responsiveness and consistency of the height control valve.

Figure 8A:
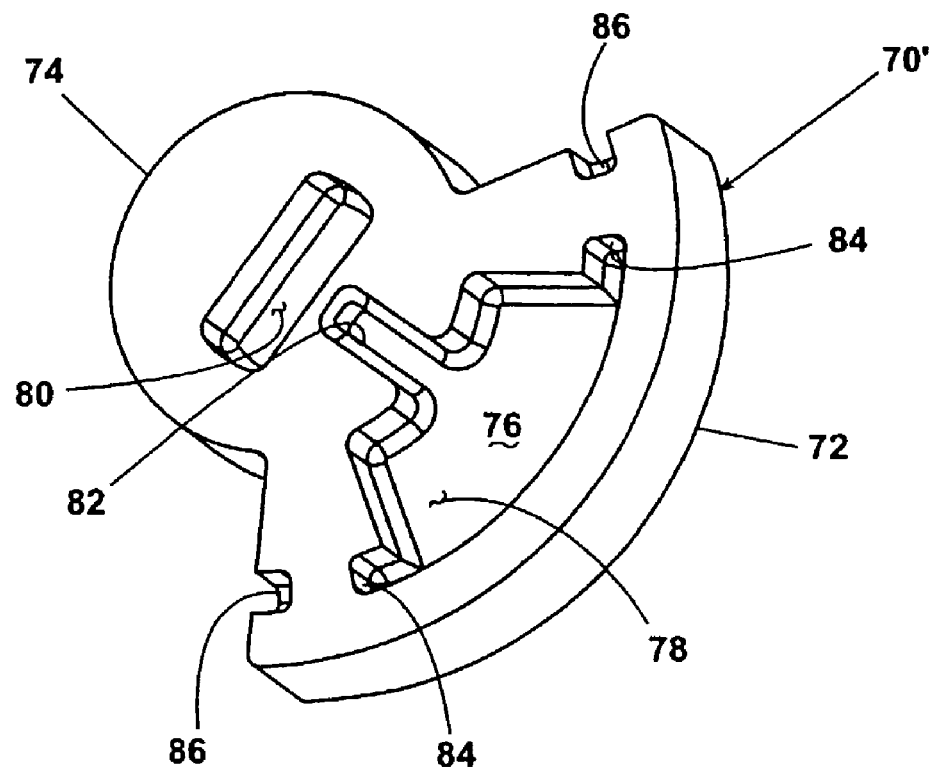
FIG. 8A is an alternative construction of the dynamic shear disk of FIG. 8.

FIG. 8A illustrates an alternative construction of the dynamic disk 70. The alternative construction 70' is substantially identical to the dynamic disk 70 except that the connecting channel 82 does not extend into the key slot, but terminates prior to the key slot 80. For the dynamic disk 70 to function properly, it is only necessary that the connecting channel 82 extend a sufficient distance to establish fluid communication with the passage 62 to thereby establish fluid communication between the exhaust port 40 and the recess 76.

Figure 9:
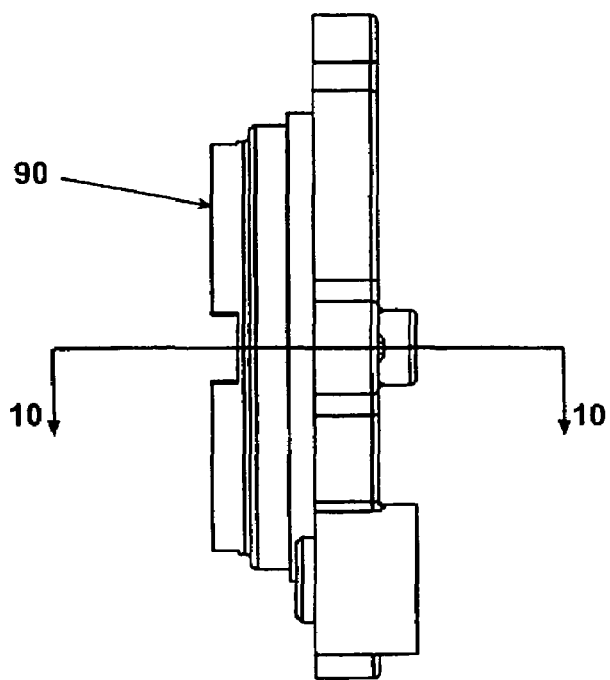
FIG. 9 is a side view of the height control valve cover shown in FIG. 2.
Figure 10:
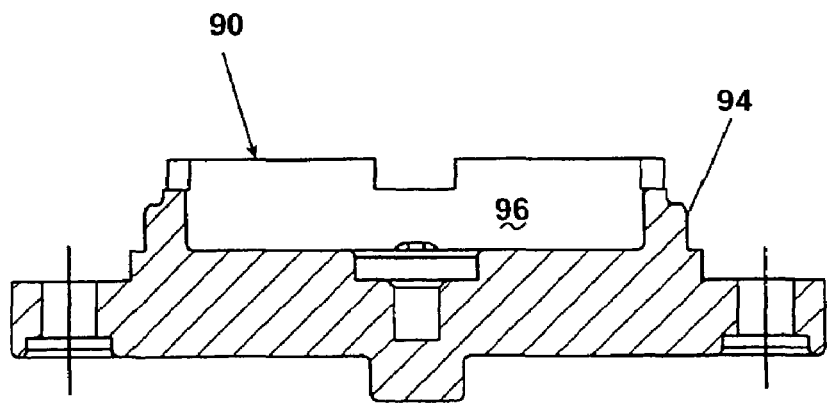
FIG. 10 is a sectional view taken along line 10—10 of FIG. 9.

Referring now to FIGS. 2, 9 and 10, a cover 90 closes the interior chamber 36 of the housing 30 and retains the dynamic shear disk 70 and static shear disk 60 within the housing. An O-ring 92 is provided to enhance the seal between the cover 90 and the housing 30. As best seen in FIGS. 8 and 9, the cover 90 comprises an annular stepped collar 94 that defines an interior recess 96 in which the dynamic shear disk 70 and static shear disk 60 are received. The O-ring 92 is preferably received around the periphery of the step collar 94.

The assembly of the height control valve will now be summarily described. It should be noted that the sequence of many of the steps in the assembly of the height control valve are interchangeable and not important to the invention. The assembly is merely provided for an understanding of the interconnection of the many components of the height control valve. In assembling the height control valve, the shaft 48 is fitted with an O-ring 100 and slidably inserted into the shaft sleeve 37 until the stop collar 52 abuts the interior of the housing 30. The handle seal 53 and handle cap 54 are slidably mounted over the end of the shaft 48 where the hexagonal shaft collar 55 is received over the adjustable hex head 51. The handle 32 is mounted to the handle mount 54 as previously described and is retained with a nut threaded on the end of the shaft.

The manifold cover 41B is affixed to the end of the housing 30 by bolts 102 extending through the manifold cover 41B and threaded into tapped openings in the housing 30. The gasket 45 is positioned between the manifold and the housing 30 prior to affixation of the manifold cover 41B.

Prior to the installation of the static shear disk 60 and dynamic shear disk 70, a tandem O-ring 104 is positioned within a correspondingly shaped groove 106 formed on the interior of the housing 30 and surrounding the shaft sleeve 37 and the transverse portion of the air spring port 39. The static shear disk 60 is positioned within the interior chamber 36 and aligned therein by inserting the alignment stud 68 into the alignment opening 66.

The dynamic shear disk 70 is positioned in the interior chamber 36 and the key 50 of the shaft 48 is received within key slot 80 of the dynamic shear disk 70 to align the dynamic shear disk 70 relative to the shaft 48 and the shear disk 60. The orientation of the dynamic shear disk 70 is adjusted until the orifice 64 lies between one of the pairs of outlet profile slots 84 and inlet profile slots 86 on the dynamic shear disk. In this position, the air spring port 39 is fluidly sealed relative to the air supply port 38 and the exhaust port 40.

The assembly of the height control valve is completed by placing the O-ring 92 on the cover 90 and positioning the cover 90 over the housing and fixing the cover 90 to the housing by threaded bolts 102 that are received within tapped openings in the housing 30.

No O-ring or other type of seal is required between the dynamic disk and the static disk since pressurized air is continually supplied through the inlet port to the portion of the chamber between the cover and the dynamic disk and the pressurized air biases the dynamic disk against the static disk a sufficient amount to seal the disks relative to each other.

The static disk 60 and the dynamic disk 70 are preferably made from ceramic or any other material having suitable wear-resistant characteristics. It is within the scope of the invention for the static disk 60 not to be used and the dynamic disk would directly abut the housing. In such a configuration, the housing is preferably made from a suitable wear-resistant material. No traditional seal, an O-ring or the like, would be required between the dynamic disk and the housing.

Figure 11:
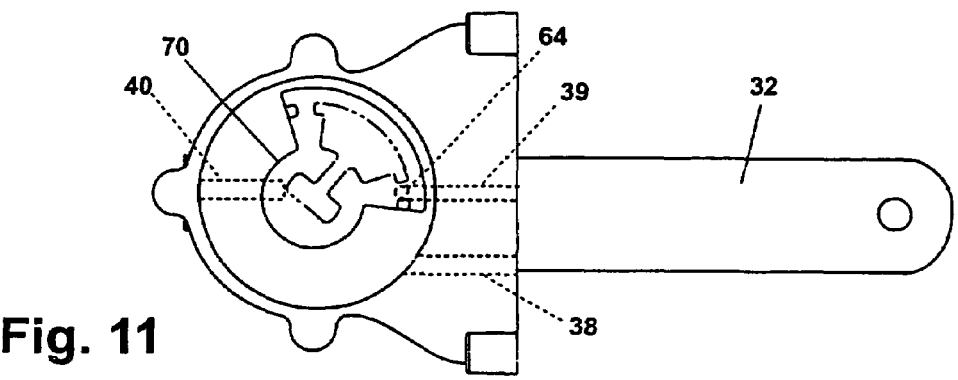
FIG. 11 is a schematic view illustrating the height control valve of FIG. 2 in a neutral position.

The operation of the suspension and the height control valve will be described in the context of the height control valve's three operation positions: fill position, neutral position, and exhaust position. For purposes of this description, it will be assumed that the height control valve begins in the neutral position. In the neutral position shown in FIG. 11, the dynamic shear disk 70 is oriented relative to the shear disk 60 such that the shear disk orifice 64 is positioned between the extension slot 84 and the exterior slot 86 and in abutting relationship with the dynamic shear disk 70, effectively sealing the transverse portion of the air spring port 39 and blocking fluid communication from either the air supply port 38 or exhaust port 40 to the air spring port 39. In the neutral position, the lever 32 is preferably horizontally oriented.

Figure 12:
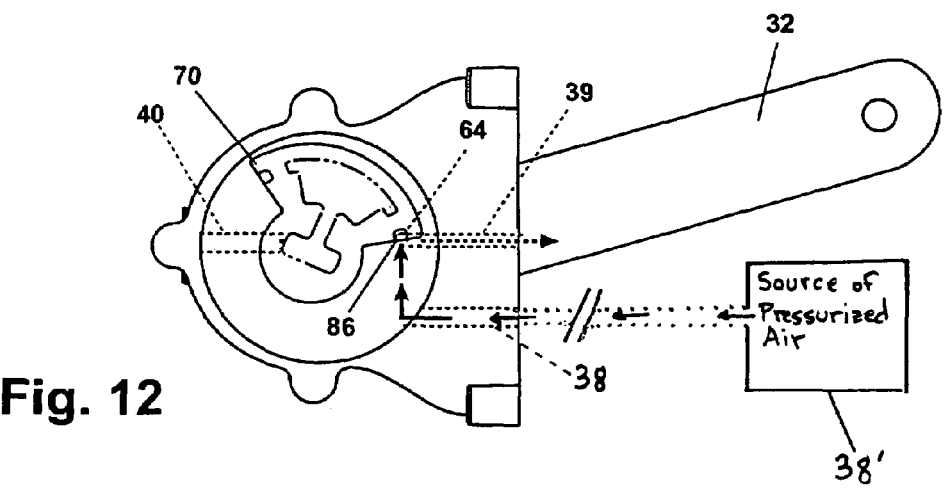
FIG. 12 is a schematic view illustrating the height control valve of FIG. 2 in a filled position.

If for any reason there is relative movement of the trailing arm 14 towards the frame rail 16, such as an increase in the loading of the trailer, the lever 32 will rotate upwardly in FIG. 12 thereby rotating the shaft 48 and ultimately the dynamic shear disk 70 so that the orifice 64 moves into fluid communication with the exterior slot 86 to open the air spring port 39 to the interior chamber 36. Since the interior chamber 36 is constantly exposed to the air supply port 38, pressurized air from a source of pressurized air 38' will be directed into the air spring port 39 and introduce pressurized air into the air springs. As the air springs are inflated, the frame rail 16 and trailing arm 14 move relatively away from each other, which ultimately rotates the lever 32 and the dynamic shear disk 70 back to the neutral position.

Figure 13:
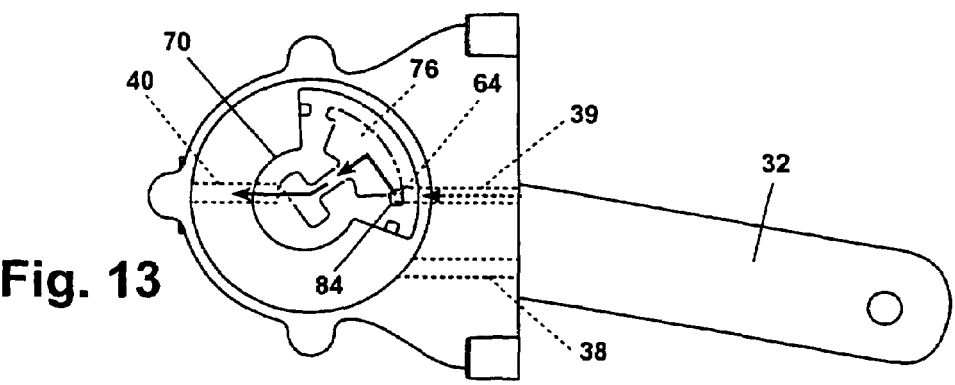
FIG. 13 is a schematic view illustrating the height control valve of FIG. 2 in an exhaust position.

If the trailing arm 14 and frame rail 16 move away relative to each other, the lever 32 is urged downwardly, as viewed in FIG. 13, moving the dynamic shear disk 70 relative to the shear disk 60, so that the orifice 64 is moved into fluid communication with the recess 76, preferably at an extension slot 84, which is referred to as the exhaust position. In the exhaust position, the air spring port 39 is in fluid communication with the exhaust port 40 through the recess 76. The pressurized air in the air springs is exhausted through the exhaust port 40 to the atmosphere through the recess 76. As the pressurized air is exhausted from the air spring, the trailing arm 14 and the frame rail 16 move relatively towards each, which rotates the lever 32 upward and moves the extension slot 84 toward the orifice 64. The exhausting of the pressurized air from the air springs will continue until the orifice 64 is positioned between the extension slot 84 and the exterior slot 86.

It should also be noted that when assembled, the shaft 48 will extend axially through the opening 62 of the static disk 60 and the key 50 will be received within the key slot 80 on the dynamic disk 70 to thereby axially align the rotational axis of the dynamic disk 70 with the central axis of the static disk 60. In this position, the connecting channel 82 extends over the static disk opening 62 to establish fluid communication between the exhaust port 40 and the profile slots 84 in the arcuate portion 78 of the recess 76.

I should also be noted that when assembled, the shaft 48 will extend axially through the opening 62 of the static disk 60 and the key 50 will be received within the key slot 80 on the dynamic disk 70 to thereby axially align the rotational axis of the dynamic disk 70 with the central axis of the static disk 60. In this position, the connecting channel 82 extends over the static disk opening 62 to establish fluid communication between the exhaust port 40 and the profile slots 84 in the arcuate portion 78 of the recess 76.

Figure 14:
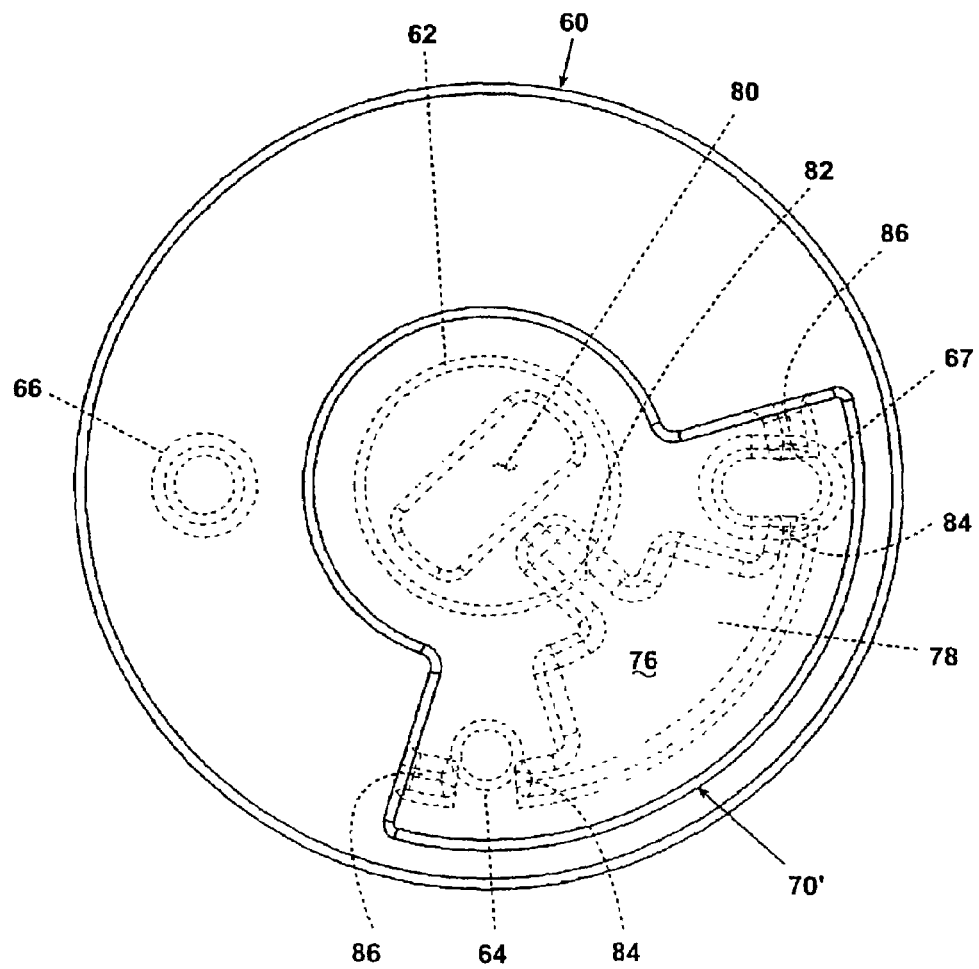
FIG. 14 is an enlarged view of the alternative dynamic disk and the fixed disk in their assembled positions with the outlet and inlet profile slots of the dynamic disk and the air spring passage of the fixed disk illustrated in phantom lines.

As best seen in FIG. 14, the outlet profile slots 84 and inlet profiles 86 are radially offset a distance from the rotational axis of the dynamic disk 70 a greater distance than the opening 64 is radially offset from the central axis of the fixed disk 60. A result of the radially offset discrepancy between the outlet and inlet profile slots 84, 86 with respect to the opening 64 is that as the dynamic disk 70 is rotated relative to the fixed disk 60 only a corner portion of the outlet and inlet profile slots 84, 86 will initially overlie the opening 64. Upon continued rotation, a great cross-sectional area of the outlet or inlet profile slots 84, 86 will overlie the opening 64, resulting in an increase in cross-sectional area of the outlet and inlet profile slots 84, 86 overlying the opening 64. The increasing cross-sectional area effectively controls the flow rate of the fluid therethrough.

Figure 15:
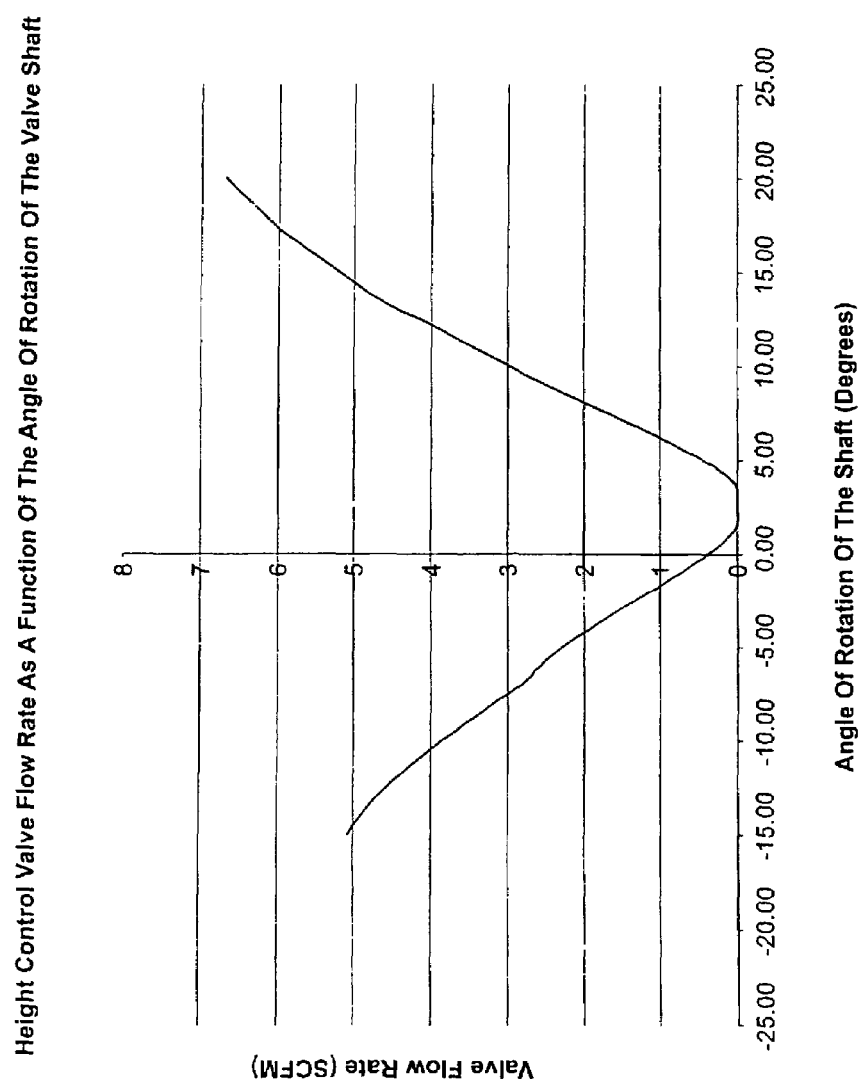
FIG. 15 is a chart illustrating the air flow rate through the air spring passage and the inlet and outlet profile slots at various degrees of rotation of the dynamic disk relative to the fixed disk.

FIG. 15 illustrates a chart showing the increasing flow rate through the aligned outlet and inlet profile slots 84, 86 as a function of the degree of rotation of the dynamic disk 70 relative to the static disk 60. In other words, as the dynamic disk 70 is rotated a greater amount relative to the static disk 60, the greater is the cross-sectional area of either the outlet profile slot 84 or inlet profile slot 86 that overlies the opening 64. The control of the flow rate through the aligned profile slots and opening 64 effectively permits control over the amount of fluid that is either added or deleted from the air springs. This flow rate control permits the height control valve to effectively turn on at a slower rate to prevent overcompensating for smaller changes in the relative heights between the vehicle frame and the trailing arm, which correspond to smaller angular rotations of the dynamic disk 70 relative to the fixed disk 60, while still permitting appropriate response for large scale changes, which are indicated by greater rotational changes.

The proportional flow rate feature of the valve can also be accomplished by varying the shaped of the blind openings or the air spring port in addition to or in place of the radial offset between the blind openings and the air spring port.

Figure 16:
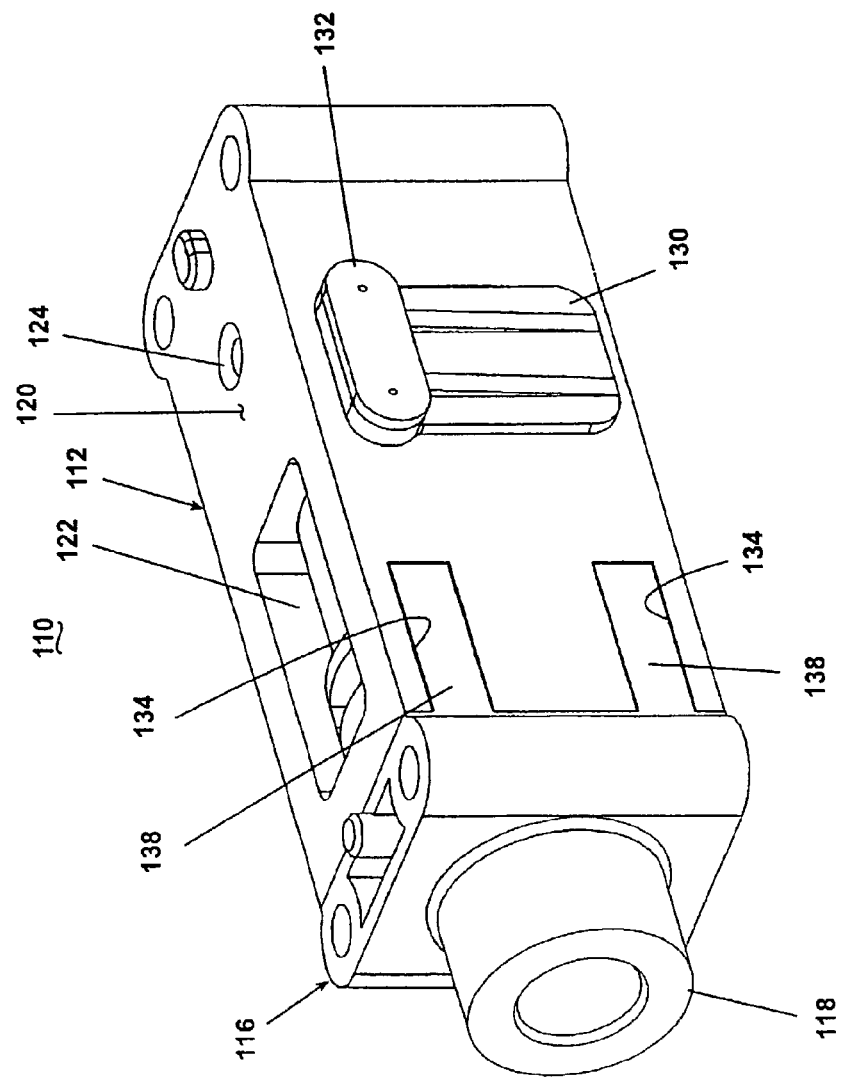
FIG. 16 is a perspective view of a modular dump valve for use with the height control valve according to the invention.
Figure 17:
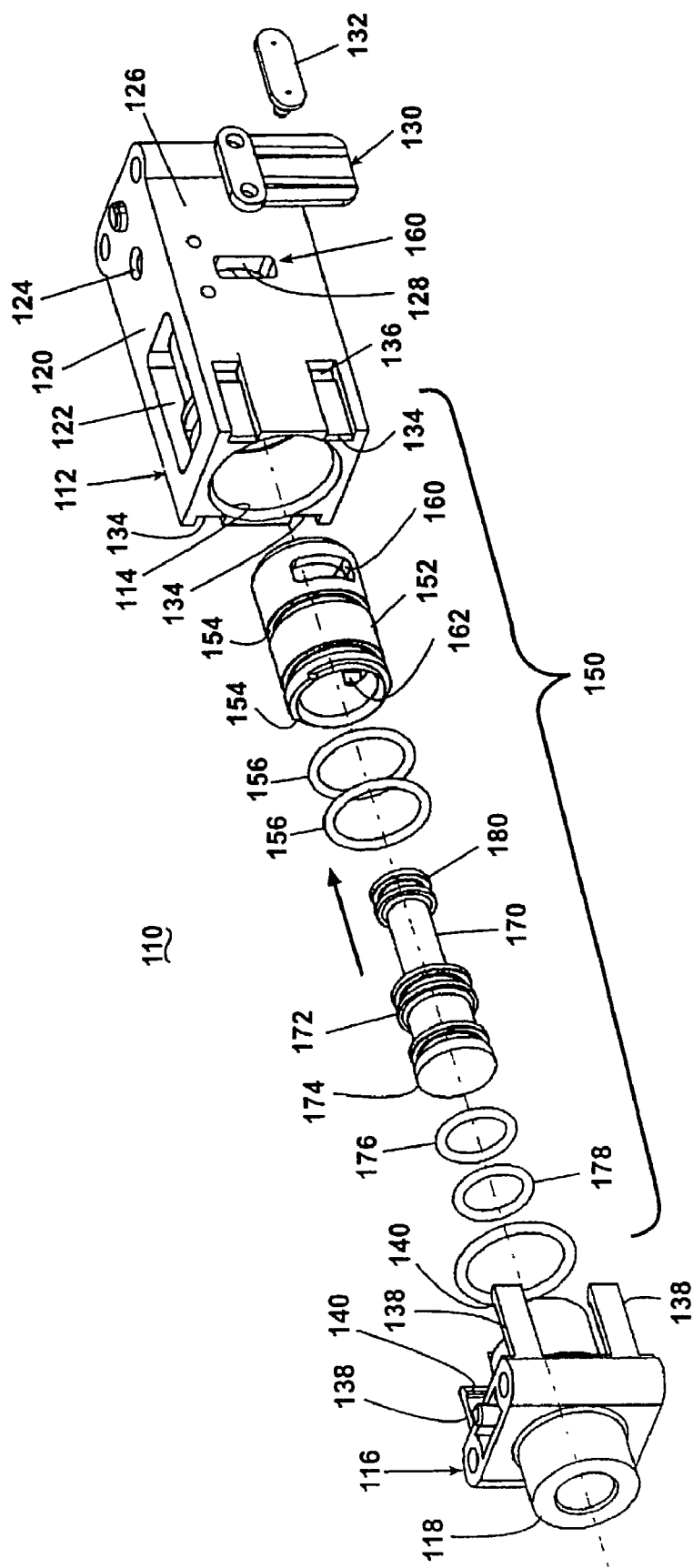
FIG. 17 is an exploded view of a dump valve of FIG. 16.

FIGS. 16 and 17 illustrate a dump valve 110 that is particularly well suited for the port modularity functionality of the height control valve according to the invention. The dump valve 110 comprises a housing formed of a body 112 that defines an interior chamber 114, which is closed by a top 116 that incorporates a fluid connector 118. The dump valve body 112 has a manifold body surface 120 in which is formed an air spring opening 122 and an air supply opening 124. An air spring connector opening (not show) corresponding to the air spring opening is provided on the opposite side of the body and fluidly couples to the air spring connector of the cover. An exterior side surface 126 includes an exhaust opening 128 that can be covered by a resilient cover 130 which is secured to the side surface 126 by a fastener 132.

The end of the dump valve body 112 includes four channels 134, each of which includes a detent 136. The cover 116 includes fingers 138 that correspond to the channels 134. Each of the fingers 138 include a finger 140 that is received within the detent 136 when the cover is snap-fitted to the body.

A valve 150 is disposed within the dump valve body 112 and control fluid communication from the air spring port 122 to either the corresponding air spring connector port and the exhaust port 128. The valve comprises a cartridge 152 having annular grooves 154 and in which are received corresponding O-rings 156, which seal the cartridge 152 relative to the interior of the dump valve body 122 when the cartridge is inserted into the opening 114. An exhaust passage 160 is formed in a sidewall of the cartridge 152 as is an air spring passage 162. The exhaust passage 160 aligns with the exhaust opening 128 and the air spring passage 162 aligns with a air spring port (not shown) on the opposite side of the dump valve body 122 from the air spring opening 122. An annular rib (not shown) is formed on the interior of the cartridge 152 approximately at the same location of the groove 154.

A spool 170 controls the fluid communication between the air spring opening 122 and the air spring passage 162 and exhaust passage 160. The spool 170 comprises adjacent pairs of annular flanges 172 and 174, which receive O-rings 176 and 178, respectively. A spring (not shown) extends from the opposite end of the spool 170. A lower O-ring 180 is provided to seal the lower end of the spool 170.

When the spool 170 is assembled within the cartridge 152 and placed within the dump valve body 112, the O-ring 176 is disposed on the side of the interior rib nearest the exhaust opening 160 and the O-ring 178 is disposed on the side of the interior rib nearest the air spring passage 162. The spring biases the spool 170 such that the O-ring 176 seals against the interior rib and prevents fluid communication between air spring opening 122 and the exhaust passage 160 to thereby prevent the exhaustion through the exhaust opening 128. Upon the manual activation by the user, pressurized air is introduced into the connection 18 on the cover 116 of the dump valve 110. The pressurized air bears against the end of the spool and overcomes the force of the spring 180 to move the spool 170 away from the cover 116. As the spool 170 moves away from the cover 116, the O-ring 176 un-seats relative to the interior annular rib and the cartridge 152 and the O-ring 178 passes over the air spring passage 176 and is positioned between the air spring passage 162 and the air spring opening 122 to thereby establish fluid communication from the air spring opening 122, through the interior the cartridge 152, through the exhaust passage 160, where the air can exhaust through the exhaust opening 128 and thereby exhaust all of the pressurized air from the air springs.

As will be obvious by a brief of FIG. 17, when assembled, the dump valve 110 has a profile that is substantially identical to the manifold body 41A and the manifold cover 41B. Therefore, the dump valve 110 can be interposed between the manifold body 41A and the cover 41B and provide for a modular dump valve assembly that can be easily added to the height control valve if desired. When the dump valve 110 is not in the dump position, the dump valve 110 maintains fluid communication through the supply connection to the inlet port 38 and the air spring connections 43, 44 through the air supply port 39. An additional advantage of the dump valve 110 is that multiple manifold covers 41B can be used with the dump valve 110 in the same manner as described above with respect to the height control valve alone.

The suspension and height control valve, according to the invention, provide a very simple and effective means for controlling the ride height of a vehicle. Unlike prior height control valves that tended to use relatively complex plunger/piston arrangements within the various ports of the height control valve, the rotating disk structure of the height control valve 12 along with the location of the various ports provides a much simpler construction and uses parts that are not as susceptible to wear and degradation over time.

While the invention has been specifically described in connection with certain specific embodiments thereof, it is to be understood that this is by way of illustration and not of limitation, and the scope of the appended claims should be construed as broadly as the prior art will permit.

What is claimed is:

1. A height control valve for controlling the relative height between a vehicle frame and a trailing arm suspension comprising a trailing arm having one end pivotally mounted to the vehicle frame and carrying an axle that rotatably mounts ground engaging wheels, and an air spring positioned between another end of the trailing arm and the vehicle frame to resist the rotation of the trailing arm relative to the frame, the height control valve comprising:
   a housing defining an interior chamber and having an inlet port for fluidly connecting to a source of pressurized air, an air spring port for fluidly connecting to the air spring, and a shaft opening extending through a first wall, the shaft opening forming at least a portion of an exhaust port for fluidly connecting to atmosphere;
   a manifold cover module removably mounted to a manifold body to enclose the air spring port and the inlet port;
   a control valve comprising a rotatable disk having a first side which abuts a first wall disposed within the interior chamber, the rotatable disk having a seal formed by pressurized air supplied from the source of pressurized air to the interior chamber, which biases the first side of the rotatable disk against the first wall, the rotatable disk selectively operable between a fill position where the air spring port is fluidly connected to the inlet port to introduce the pressurized air into the air spring, an exhaust position where the air spring port is fluidly connected to the exhaust port to exhaust the pressurized air from the air spring, and a neutral position where the air spring port is fluidly disconnected from both the inlet port and the exhaust port, to thereby control the introduction and exhaustion of air from the air spring to rotate the trailing arm relative to the vehicle frame and adjust the height of the vehicle frame;
   wherein the seal is formed substantially by the force of the pressurized air supplied from the source of pressurized air to the interior chamber;
   wherein the rotatable disk is disposed within the interior chamber and fluidly separates the inlet port and the exhaust port, the rotatable disk having a control passage that fluidly connects the air spring port to the inlet port or the exhaust port upon rotation of the rotatable disk; and
   wherein the air spring port and the exhaust port are positioned on the first wall, and the inlet port is positioned on a second wall wherein the first side of the disk overlies the air spring port and the exhaust port.

2. The height control valve according to claim 1, wherein the control passage comprises first and second spaced blind openings formed in the first side of the disk and a separating wall formed by the portion of the disk disposed between the blind openings, wherein when the rotatable disk is in the neutral position, the separating wall overlies the air spring port to prevent fluid communication between the air spring port and either the exhaust port or the inlet port, when the disk is rotated a first rotational direction from the neutral position, the first blind opening is in fluid communication with the inlet port and the air spring port to place the control valve in the fill position, when the disk is rotated in a second rotational direction, opposite the first rotational direction, from the neutral position, the second blind opening is in fluid communication with the exhaust port and the air spring port to place the control valve in the exhaust position.

3. The height control valve according to claim 2, wherein the first and second blind openings are shaped such that an increasing cross-sectional area of the first and second blind opening is exposed to the air spring port as the valve is moved from the neutral position to the fill and exhaust positions, respectively, to provide for increasing air flow as a function of the degree of rotation of the disk.

4. The height control valve according to claim 2, wherein the first and second blind openings are positioned on the disk relative to the air spring port such that an increasing cross-sectional area of the first and second blind openings is exposed to the air spring port as the rotatable disk is moved from the neutral position to the fill and exhaust positions, respectively, to provide for increasing air flow rate as a function of the degree of rotation of the rotatable disk.

5. The height control valve according to claim 2, wherein the first blind opening extends from the separating wall to a peripheral edge of the disk so that the first blind opening is always in fluid communication with the inlet port.

6. The height control valve according to claim 2, wherein the second blind opening extends from the separating wall to the exhaust port so that the second blind opening is always in fluid communication with the exhaust port.

7. The height control valve according to claim 1, characterized by a lever having one end operably coupled to the rotatable disk and another end adapted to be connected to the trailing arm, whereby the rotation of the trailing arm moves the lever to thereby move the rotatable disk between the neutral, fill, and exhaust positions.

8. The height control valve according to claim 7, wherein the lever comprises first and second elongated arms, the first arm has one end fixedly coupled to the rotatable disk, the second arm has one end adapted to be connected to the trailing arm, and the second arm is rotatably adjustable relative to the first arm to provide for adjusting the height of the lever relative to the trailing arm.

9. The height control valve according to claim 8, wherein the first arm comprises an opening, the second arm has a second end that is rotatably attached relative to the first arm and an arcuate slot that aligns with the first arm opening, and a releasable fastener extending through the first arm opening and the second arm arcuate slot to permit the selective rotational positioning of the second arm relative to the first arm to adjust the height of the lever.

10. The height control valve according to claim 1, wherein a control passage is provided in the rotatable disk, the control passage presenting an increasing cross-sectional area to the air spring port as the rotatable disk is moved to either the fill or exhaust positions to provided for increasing air flow rate as a function of the degree of movement of the rotatable disk.

11. A height control valve for controlling the relative height between a vehicle frame and a trailing arm suspension comprising a trailing arm having one end pivotally mounted to the vehicle frame and carrying an axle that rotatably mounts around engaging wheels, and an air spring positioned between another end of the trailing arm and the vehicle frame to resist the rotation of the trailing arm relative to the frame, the height control valve comprising:

a housing defining an interior chamber and having an inlet port for fluidly connecting to a source of pressurized air, an air spring port for fluidly connecting to the air spring, and a shaft opening extending through a first wall, the shaft opening forming at least a portion of an exhaust port for fluidly connecting to atmosphere;

a manifold cover module removably mounted to a manifold body to enclose the air spring port and the inlet port;

a control valve comprising a rotatable disk having a first side which abuts a first wall disposed within the interior chamber, the rotatable disk having a seal formed by pressurized air supplied from the source of pressurized air to the interior chamber, which biases the first side of the rotatable disk against the first wall, the rotatable disk selectively operable between a fill position where the air spring port is fluidly connected to the inlet port to introduce the pressurized air into the air spring, an exhaust position where the air spring port is fluidly connected to the exhaust port to exhaust the pressurized air from the air spring, and a neutral position where the air spring port is fluidly disconnected from both the inlet port and the exhaust port, to thereby control the introduction and exhaustion of air from the air spring to rotate the trailing arm relative to the vehicle frame and adjust the height of the vehicle frame;

wherein the seal is formed substantially by the force of the pressurized air supplied from the source of pressurized air to the interior chamber; and a static disk positioned between the first wall and the rotatable disk and coupled to the first wall such that the static disk does not move relative to the first wall upon rotation of the rotatable disk, the static disk having an exhaust passage extending therethrough and in fluid communication with the exhaust port and an air spring passage extending therethrough and in fluid communication with the air spring port.

12. A height control valve for controlling the relative height between a vehicle frame and a trailing arm suspension comprising a trailing arm having one end pivotally mounted to the vehicle frame and carrying an axle that rotatably mounts ground engaging wheels, and an air spring positioned between another end of the trailing arm and the vehicle frame to resist the rotation of the trailing arm relative to the frame, the height control valve comprising:

a housing defining an interior chamber and having an inlet port for fluidly connecting to a source of pressurized air, an air spring port for fluidly connecting to the air spring, and a shaft opening extending through a first wall, the shaft opening forming at least a portion of an exhaust port for fluidly connecting to atmosphere;

a manifold cover module removably mounted to a manifold body to enclose the air spring port and the inlet port;

a control valve comprising a rotatable disk having a first side which abuts a first wall disposed within the interior chamber, the rotatable disk having a seal formed by pressurized air supplied from the source of pressurized air to the interior chamber, which biases the first side of the rotatable disk against the first wall, the rotatable disk selectively operable between a fill position where the air spring port is fluidly connected to the inlet port to introduce the pressurized air into the air spring, an exhaust position where the air spring port is fluidly connected to the exhaust port to exhaust the pressurized air from the air spring, and a neutral position where the air spring port is fluidly disconnected from both the inlet port and the exhaust port, to thereby control the introduction and exhaustion of air from the air spring to rotate the trailing arm relative to the vehicle frame and adjust the height of the vehicle frame;

wherein the seal is formed substantially by the force of the pressurized air supplied from the source of pressurized air to the interior chamber;

a shaft extending through the shaft opening and affixed to the disk whereby the rotation of the shaft rotates the rotatable disk between the neutral, fill, or exhaust positions; and wherein the rotatable disk comprises a slot and the shaft comprises a key received within the slot to connect the shaft and the rotatable disk.

13. The height control valve according to claim 12, and further comprising a resin disposed within the slot to fill in any spaces between the key and the slot.

14. The height control valve according to claim 12, and further comprising a lever having one end connected to the shaft and another end adapted to be connected to the trailing arm, whereby the rotation of the trailing arm moves the lever to thereby rotate the shaft and move the rotatable disk between the neutral, fill, and exhaust positions.

15. The height control valve according to claim 14, wherein the lever comprises first and second elongated arms, the first arm has one end fixedly mounted to the shaft, the second arm has one end adapted to be connected to the trailing arm, and the second arm is rotatably adjustable relative to the first arm to provide for adjusting the height of the lever relative to the trailing arm.

16. The height control valve according to claim 15, wherein the first arm comprises an opening, the second arm has another end that is rotatably mounted to the shaft and an arcuate slot that aligns with first arm opening, and a releasable fastener extending through the first arm opening and the second arm arcuate slot to permit the selective rotational positioning of the second arm relative to the first arm to adjust the height of the lever.

17. A height control valve for controlling the relative height between a vehicle frame and a trailing arm suspension comprising a trailing arm having one end pivotally mounted to the vehicle frame and carrying an axle that rotatably mounts ground engaging wheels, and an air spring positioned between another end of the trailing arm and the vehicle frame to resist the rotation of the trailing arm relative to the frame, the height control valve comprising:
   a housing defining an interior chamber and having an inlet port for fluidly connecting to a source of pressurized air, an air spring port for fluidly connecting to the air spring, and an exhaust port for fluidly connecting to atmosphere; and
   a control valve disposed within the interior chamber and selectively operable between a fill position where the air spring port is fluidly connected to the inlet port to introduce pressurized air from the source of pressurized air into the air spring, an exhaust position where the air spring port is fluidly connected to the exhaust port to exhaust the pressurized air from the air spring, and a neutral position where the air spring port is fluidly disconnected from both the inlet port and the exhaust port, to thereby control the introduction and exhaustion of air from the air spring to rotate the trailing arm relative to the vehicle frame and adjust the height of the vehicle frame;
   wherein the housing is characterized by a manifold body defining an air spring chamber fluidly connected to the air spring port and an inlet chamber fluidly connected to the inlet port, and a manifold cover module removably mounted to the manifold body to enclose the air spring chamber and the inlet chamber; and
   wherein the manifold cover module comprises at least one air supply connector for fluidly coupling a source of pressurized air to the inlet chamber and at least one air spring connector for fluidly connecting the air spring chamber to the air spring.

18. The height control valve according to claim 17, wherein the manifold cover module further comprises an accessory connector for fluidly connecting a vehicle accessory to the air spring chamber.

19. The height control valve according to claim 18, and further comprising a modular dump valve removably mounted between the manifold body and the manifold cover module for fluidly connecting the air spring port to the exhaust port to exhaust the pressurized air from the air spring independent of the position of the height control valve.

20. The height control valve according to claim 19, wherein the dump valve comprises a dump valve housing having:
   an inlet passage that fluidly connects the at least one air supply connector to the inlet chamber;
   an air spring passage fluidly connecting the air spring chamber to the at least one air spring connector; and
   a dump valve exhaust port, and
   a dump valve element positioned within the air spring passage for fluidly connecting the air spring chamber to the air spring connector or the dump valve exhaust port to the air spring connector to exhaust the pressurized air from the air spring.

21. The height control valve according to claim 20, wherein the air spring passage comprises a dump chamber formed within the dump valve housing and fluidly connected to the dump valve exhaust port, the dump chamber having a first opening fluidly connected to the air spring chamber and a second opening fluidly connected to the air spring connector, and the dump valve element is a spool valve operable between a first position where the first and second openings are fluidly connected and a second position where the first opening is fluidly connected to the dump valve exhaust port.

22. A height control valve for controlling the relative height between a vehicle frame and a trailing arm suspension comprising a trailing arm having one end pivotally mounted to the vehicle frame and carrying an axle that rotatably mounts ground engaging wheels, and an air spring positioned between another end of the trailing arm and the vehicle frame to resist the rotation of the trailing arm relative to the frame, the height control valve comprising:
   a housing defining an interior chamber and having an inlet port for fluidly connecting to a source of pressurized air, an air spring port for fluidly connecting to the air spring, and a shaft opening extending through a first wall, the shaft opening forming at least a portion of an exhaust port for fluidly connecting to atmosphere;
   a manifold cover module removably mounted to a manifold body to enclose the air spring port and the inlet port;
   a control valve comprising a rotatable disk having a first side which abuts a first wall disposed within the interior chamber, the rotatable disk having a seal formed by pressurized air supplied from the source of pressurized air to the interior chamber, which biases the first side of the rotatable disk against the first wall, the rotatable disk selectively operable between a fill position where the air spring port is fluidly connected to the inlet port to introduce the pressurized air into the air spring, an exhaust position where the air spring port is fluidly connected to the exhaust port to exhaust the pressurized air from the air spring, and a neutral position where the air spring port is fluidly disconnected from both the inlet port and the exhaust port, to thereby control the introduction and exhaustion of air from the air spring to rotate the trailing arm relative to the vehicle frame and adjust the height of the vehicle frame;
   wherein the seal is formed substantially by the force of the pressurized air supplied from the source of pressurized air to the interior chamber;
   wherein a control passage is provided in the rotatable disk, the control passage presenting an increasing cross-sectional area to the air spring port as the rotatable disk is moved to either the fill or exhaust positions to provided for increasing air flow rate as a function of the degree of movement of the rotatable disk; and
   wherein the housing comprises a second wall extending from the first wall to partially define the interior chamber, the air spring port and the exhaust port being positioned on the first wall, and the inlet port being positioned on the second wall, the rotatable disk having a first and second opposing sides connected by a peripheral edge, the first side of the disk overlies the air spring port and the exhaust port and the second side faces the inlet port so that pressurized air entering the chamber through the inlet port biases the disk first side against the first wall to seal the air spring port and exhaust port relative to the inlet port.

23. The height control valve according to claim 22, wherein the control passage comprises first and second spaced blind openings formed in the first side of the disk and the portion of the disk disposed between the blind openings forms a separating wall, the first and second blind openings are shaped such that an increasing cross-sectional area of the first and second blind openings is exposed to the air spring port as the rotatable disk is moved from the neutral position to the fill and exhaust positions, respectively.

24. The height control valve according to claim 22, wherein the control passage comprises first and second spaced blind openings formed in the first side of the disk and the portion of the disk disposed between the blind openings forms a separating wall, the first and second blind openings are positioned on the disk such that an increasing cross-sectional area of the first and second blind openings is exposed to the air spring port as the rotatable disk is moved from the neutral position to the fill and exhaust positions, respectively, to provide for the increasing air flow rate as a function of the degree of rotation of the disk.

25. The height control valve according to claim 24, wherein the first and second blind openings are spaced a different radial distance from a rotational axis of the disk than the air spring port.

26. A height control valve for controlling the relative height between a vehicle frame and a trailing arm suspension comprising a trailing arm having one end pivotally mounted to the vehicle frame and carrying an axle that rotatably mounts ground engaging wheels, and an air spring positioned between another end of the trailing arm and the vehicle frame to resist the rotation of the trailing arm relative to the frame, the height control valve comprising:
   a housing defining an interior chamber and having an inlet port for fluidly connecting to a source of pressurized air, an air spring port for fluidly connecting to the air spring, and a shaft opening extending through a first wall, the shaft opening forming at least a portion of an exhaust port for fluidly connecting to atmosphere;
   a manifold cover module removably mounted to a manifold body to enclose the air spring port and the inlet port;
   a control valve comprising a rotatable disk having a first side which abuts a first wall disposed within the interior chamber, the rotatable disk having a seal formed by pressurized air supplied from the source of pressurized air to the interior chamber, which biases the first side of the rotatable disk against the first wall, the rotatable disk selectively operable between a fill position where the air spring port is fluidly connected to the inlet port to introduce the pressurized air into the air spring, an exhaust position where the air spring port is fluidly connected to the exhaust port to exhaust the pressurized air from the air spring, and a neutral position where the air spring port is fluidly disconnected from both the inlet port and the exhaust port, to thereby control the introduction and exhaustion of air from the air spring to rotate the trailing arm relative to the vehicle frame and adjust the height of the vehicle frame;
   wherein the seal is formed substantially by the force of the pressurized air supplied from the source of pressurized air to the interior chamber;
   a shaft extending through the housing and having a key, the rotatable disk having a slot that receives the key of the shaft and a resin is disposed within the slot to fill in any spaces between the key and the slot; and
   wherein the rotation of the shaft rotates the rotatable disk to selectively fluidly connect the air spring port to the inlet port and the exhaust port to place the rotatable disk in the fill and exhaust positions respectively.

27. The height control valve according to claim 26, wherein the rotatable valve element is biased into sealing abutment relative to the housing by the pressure from the pressurized air.

28. A height control valve for controlling the height between a vehicle frame and a suspension with an air spring positioned between the suspension and the vehicle frame, the height control valve comprising:
   a housing having a manifold body defining an interior chamber and having an inlet chamber connected to an inlet port for connecting to a source of pressurized air, an air spring chamber connected to an air spring port for connecting to the air spring, and an exhaust port for connecting to atmosphere,
   a manifold cover module having at least one air supply connector for fluidly coupling a source of pressurized air to the inlet chamber and at least one air spring connector for fluidly connecting the air spring chamber to the air spring, said manifold cover module being removably mounted to the manifold body to enclose the air spring chamber and the inlet chamber; and
   a control valve disposed within the interior chamber and selectively operable between:
      a fill position, where the air spring port is fluidly connected to the inlet port to introduce the pressurized air into the air spring;
      an exhaust position, where the air spring port is fluidly connected to the exhaust port to exhaust the pressurized air from the air spring; and
      a neutral position where the air spring port is fluidly disconnected from both the inlet port and the exhaust port.

29. A height control valve for controlling the height between a vehicle frame and a suspension with an air spring positioned between the suspension and the vehicle frame, the height control valve comprising:
   a housing defining an interior chamber and having an air spring port and an exhaust port positioned on a first wall and an inlet port positioned on a second wall, and a shaft opening extending through the first wall, the shaft opening forming at least a portion of the exhaust port;
   a rotatable disk disposed within the interior chamber and overlying the air spring port and the exhaust port, the rotatable disk having a control passage that fluidly connects the air spring port to the inlet port or the air spring port to the exhaust port upon rotation of the rotatable disk.

* * * * *